US012037987B2

(12) United States Patent
Szucs (10) Patent No.: US 12,037,987 B2
(45) Date of Patent: Jul. 16, 2024

(54) ENERGY CONVERTER THAT UTILIZES COMPRESSED ENVIRONMENTAL AIR

(71) Applicant: Krisztian Antal Szucs, London-Cheshunt (GB)

(72) Inventor: Krisztian Antal Szucs, London-Cheshunt (GB)

( * ) Notice: Subject to any disclaimer, the term of this patent is extended or adjusted under 35 U.S.C. 154(b) by 0 days.

(21) Appl. No.: 18/308,506

(22) Filed: Apr. 27, 2023

(65) Prior Publication Data

US 2023/0349361 A1 Nov. 2, 2023

Related U.S. Application Data

(60) Provisional application No. 63/335,359, filed on Apr. 27, 2022.

(51) Int. Cl.
*F03D 9/32* (2016.01)
*H02K 7/18* (2006.01)

(52) U.S. Cl.
CPC ............... *F03D 9/32* (2016.05); *H02K 7/183* (2013.01); *F05B 2240/941* (2013.01)

(58) Field of Classification Search
CPC .......... F03D 9/32; H02K 7/183; B64D 27/35; B64D 27/357; B64D 27/30; B64D 2221/00; H02J 2310/44
USPC ..................................................... 290/44, 55
See application file for complete search history.

(56) References Cited

U.S. PATENT DOCUMENTS

| 1,932,698 | A | | 10/1933 | Jose | |
|---|---|---|---|---|---|
| 2,941,613 | A | * | 6/1960 | Di Perna | F03D 9/32 |
| | | | | | 180/2.2 |
| 5,680,032 | A | * | 10/1997 | Pena | B60L 50/30 |
| | | | | | 290/55 |
| 6,931,850 | B2 | | 8/2005 | Frank et al. | |
| 8,344,534 | B2 | | 1/2013 | Owens | |
| 2007/0227792 | A1 | * | 10/2007 | Yonemori | B60W 10/06 |
| | | | | | 903/902 |
| 2008/0296904 | A1 | * | 12/2008 | Elahi | F03D 13/20 |
| | | | | | 290/55 |

(Continued)

OTHER PUBLICATIONS

Compressed-air car, retrieved from the internet, retrieved on Apr. 27, 2023; <URL: https://en.wikipedia.org/wiki/Compressed-air_car>.

*Primary Examiner* — Charles Reid, Jr.

(57) ABSTRACT

An energy converter that utilizes compressed environmental air includes an air compressing unit, at least one first battery, at least one second battery, a plurality of direct current (DC) accessories. The air compressing unit includes a supply duct, a nozzle duct, a pressurized air tank, a compressor, a power-generating tube, and a plurality of air-flow generators. The compressor is in fluid communication with the supply duct. The pressurized air tank is in fluid communication with the compressor. The nozzle duct is in fluid communication with the pressurized air tank. The power-generating tube is in fluid communication with the pressurized air tank and nozzle duct. The plurality of air-flow generators is operatively coupled within the power-generating tube. The plurality of air-flow generators is electrically connected to the first battery that powers the plurality of DC accessories and is electrically connected to the second battery that powers the compressor via an inverter.

18 Claims, 5 Drawing Sheets

(56) References Cited

U.S. PATENT DOCUMENTS

| | | | |
|---|---|---|---|
| 2009/0301796 A1* | 12/2009 | Wedderburn, Jr. | F03D 13/10 |
| | | | 180/2.2 |
| 2011/0100731 A1 | 5/2011 | Hassan | |
| 2013/0127393 A1* | 5/2013 | Garcia | H02J 7/1415 |
| | | | 290/55 |
| 2014/0049047 A1* | 2/2014 | Alenezi | H02K 7/1823 |
| | | | 290/52 |
| 2014/0076641 A1* | 3/2014 | Penev | B60L 8/006 |
| | | | 180/2.2 |
| 2023/0193877 A1* | 6/2023 | Yan | F03D 9/12 |
| | | | 290/55 |

* cited by examiner

ENERGY CONVERTER THAT UTILIZES COMPRESSED ENVIRONMENTAL AIR

The current application claims a priority to the U.S. provisional patent application Ser. No. 63/335,359 filed on Apr. 27, 2022.

FIELD OF THE INVENTION

The present invention relates generally to vehicular energy recovery systems. More specifically, the present invention is an energy converter that utilizes compressed environmental air.

BACKGROUND OF THE INVENTION

The field of vehicular energy recovery systems is technologically important to several industries, business organizations and/or individuals. In particular, the use of vehicular energy recovery systems is prevalent for aircraft manufacturing industries, spacecraft manufacturing industries, and automobiles industries. Existing techniques for recovering vehicular energy are deficient with regard to several aspects. For instance, existing energy recovery methods do not compress environmental air through a compressor that is powered by a set of batteries, wherein the set of batteries is recharged through a power generating system. Furthermore, existing energy recovery methods do not regenerate the energy through propeller rotation of generators as the propeller rotation is initiated by the stored compressed air.

It is therefore an objective of the present invention to provide an energy recovery converter that utilizes compressed environmental air to overcome one or more of the above-mentioned problems and/or limitations. The present invention utilizes an air compressing unit and a plurality of batteries so that a flow of environmental air can be compressed and redirected through an energy recover unit to recharge the plurality of batteries. The plurality of batteries is then able to power the air compressing unit and a plurality of electrical accessories.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a device (or Kriextra motor) for facilitating utilizing energy from compressed environmental air is disclosed. Further, the device may include a motor comprising a container (or pressurized air container) made from a lightweight material. Further, the motor may include a fuel tank. Further, the fuel tank may be located within the container. Further, the motor may include an aluminum sheet. Further, the aluminum sheet may be attached to the top of the fuel tank. Further, the motor may include at least one compressor and a plurality of batteries. Further, the at least one compressor and the plurality of batteries may be placed on the aluminum sheet. Further, the plurality of batteries may be configured to provide energy to the at least one compressor. Further, the at least one compressor may be configured to supply compressed air to the container to create high pressure. Further, the motor may include a nozzle. Further, the nozzle may be disposed on the bottom of the container. Further, the nozzle may be configured to drive air to the environment from the container. Further, the container may include a nozzle valve. Further, the condensed air in the container may open up the nozzle valve and as a consequence, the high-pressure air may be expelled into the environment through the nozzle. Further, the nozzle valve may be configured to regulate the flow of compressed air from the container to the nozzle. Further, the nozzle valve may be driven by a driver, and the outflow of the air through the nozzle may be adjustable. Further, the motor may include a tube of an appropriate cross-section. Further, the tube may be disposed on the side of the container to outflow the air. Further, the container may include a tube valve. Further, the tube may be drifting downwards to the nozzle. Further, the tube may include at least one generator. Further, a propeller may be placed on an axis on top of the at least one generator. Further, the at least one generator may be guarded to avoid contamination. Further, a lower part of the tube may be joined into the nozzle. Further, air may stream into the tube from the container through the tube valve. Further, the flow of air in the tube may drive the propellers of the at least one generator and the rotation of the propellers may generate energy for charging the plurality of batteries uninterruptedly. Further, the air in the tube may escape through the nozzle from the tube. Further, the at least one compressor may fill up the container with air (or oxygen). Further, the opening up of the nozzle valve may stream the air through the nozzle. Further, the at least one generator in the tube may generate power to charge the three batteries continuously and the at least one compressor may continuously use energy to continuously fill the container and may charge the motor on end.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

DETAIL DESCRIPTIONS OF THE INVENTION

All illustrations of the drawings are for the purpose of describing selected versions of the present invention and are not intended to limit the scope of the present invention.

The present invention is an energy converter that utilizes compressed environmental air. An exemplary embodiment of the present invention herein, can function as a motor (or engine) may function as a versatile device that has the potential to reform day-to-day life such as air transport, water transport, and medical devices. It may be used to save lives and may have a significant impact on air transport.

Further, the present invention uses environmental air as fuel, and after consumption of the fuel, the present invention emits the fuel back to the environment entirely thus eliminating environmental pollution. Further, the present invention may be of any size and may be installed on an aircraft, a drone that may support the aircraft to prolong flying time.

When an airplane may be equipped with the present invention, the cost of fuel may considerably decrease and be environmentally friendly due to the fact that the airplane uses environmental air as fuel. Further, the airplane may not carry the fuel, making the airplane lighter and opening up more spaces for the passenger compartment.

Further, a four rotor quadcopters drone may be equipped with the present invention and may achieve a continuous altitude or observation/monitoring station. Since the present invention absorbs the energy from the environment, it may be used for space surface travel similar to mars rover. Further, the present invention may be moveable and may sit on the wings of the drone. Further, the present invention is able to achieve downwards movement when the gravity is low. Further, the present invention can be remotely controlled without a flight crew to effectively reach difficult access areas.

Figure 1:
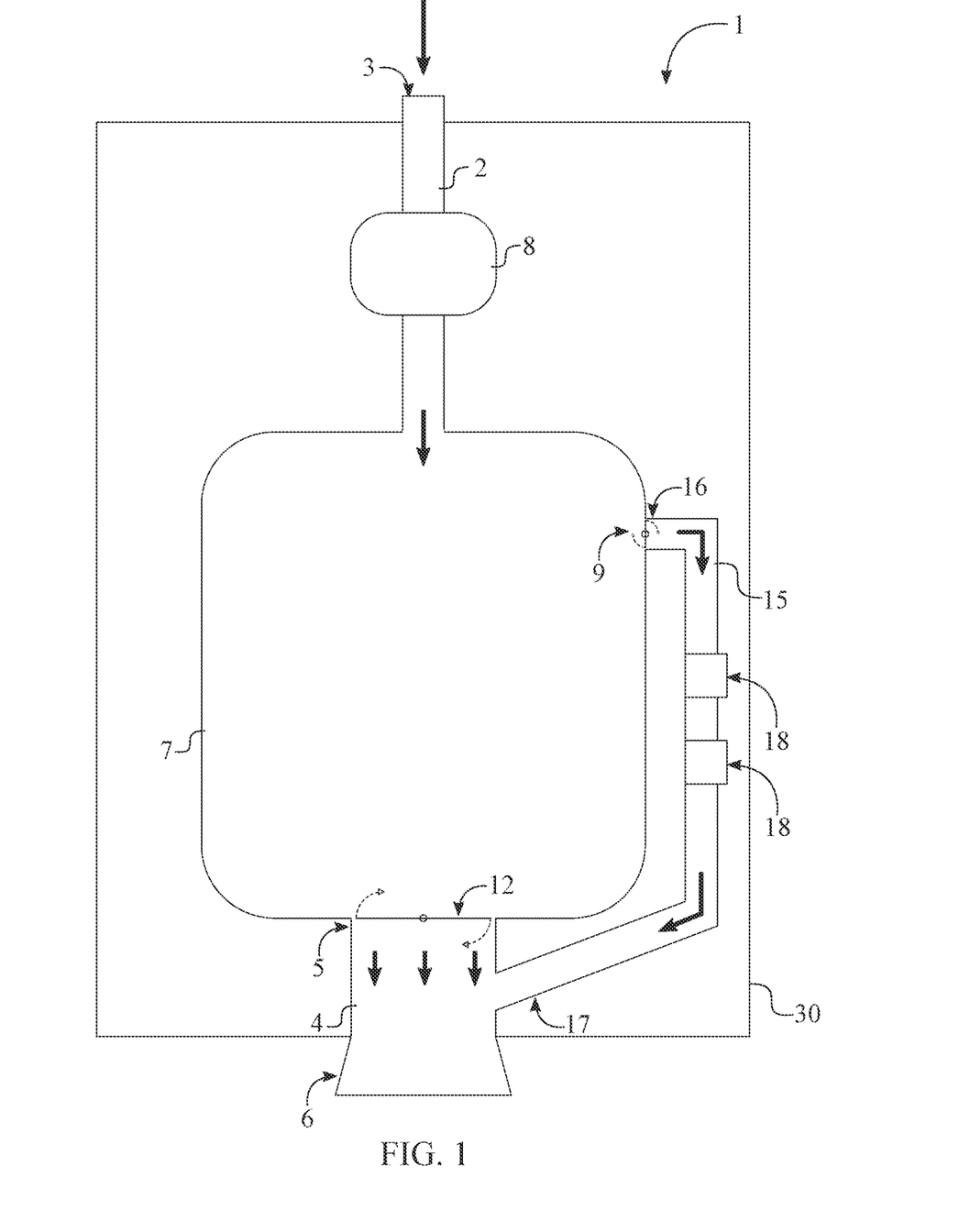
FIG. 1 is a schematic diagram illustrating the compressing unit of the present invention.
Figure 5:
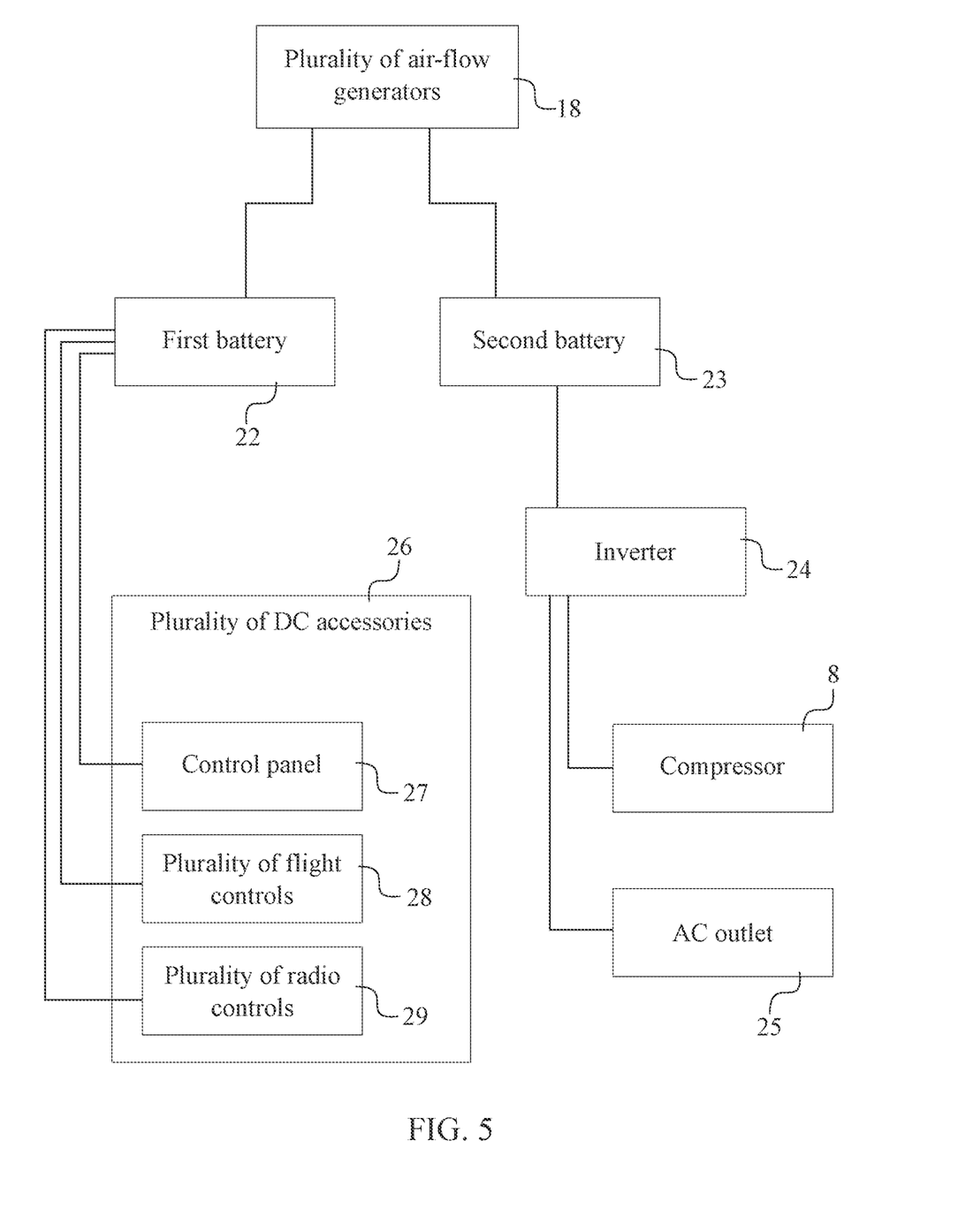
FIG. 5 is an illustration showing the electrical connection of the present invention.

In reference to FIG. 1 and FIG. 5, the present invention comprises an air compressing unit 1, at least one first battery 22, at least one second battery 23, an inverter 24, and a plurality of direct current (DC) accessories 26. The air compressing unit 1 that functions as the engine and the power generating unit comprises a supply duct 2, a nozzle duct 4, a pressurized air tank 7, a compressor 8, a power-generating tube 15, and a plurality of air-flow generators 18. In other words, the air compressing unit 1 functions as a propulsion engine as environmental air is compressed and discharged. The compressor 8 is in fluid communication with the supply duct 2 so that the compressor 8 is able to pressurize an incoming flow of environmental air that is supplied via the supply duct 2.

The pressurized air tank 7 is in fluid communication with the compressor 8. More specifically, once the incoming flow of environmental air is pressurized through the compressor 8, a pressurized flow of air from the compressor 8 can be stored with the pressurized air tank 7. Preferably, the pressurized air tank 7 is made of aluminum or other lightweight material. The nozzle duct 4 is in fluid communication with the pressurized air tank 7 and functions as a controlled-outlet port. More specifically, the nozzle duct 4 allows the pressurized air within the pressurized air tank 7 to be discharged back into the environment as a second flow of pressurized air. The power-generating tube 15 is in fluid communication with the pressurized air tank 7 and nozzle duct 4 so that the present invention is able to implement an energy recovery system. More specifically, the plurality of air-flow generators 18 is operatively coupled within the power-generating tube 15 so that a first flow of pressurized air from the pressurized air tank 7 is able to rotate the plurality of air-flow generators 18. The first battery 22 is electrically connected to the plurality of air-flow generators 18 so that generated electricity of the plurality of air-flow generators 18 can be stored. Similarly, the second battery 23 is electrically connected to the plurality of air-flow generators 18 so that generated electricity of the plurality of air-flow generators 18 can be stored. The plurality of DC accessories 26 is electrically connected to the first battery 22, and the compressor 8 is electrically connected to the second battery 23 through the inverter 24. In other words, the first battery 22 is able to electrically power the plurality of DC accessories 26, independent from the second battery 23. The second battery 23 is able to electrically power the compressor 8, independent from the first battery 22.

Figure 3:
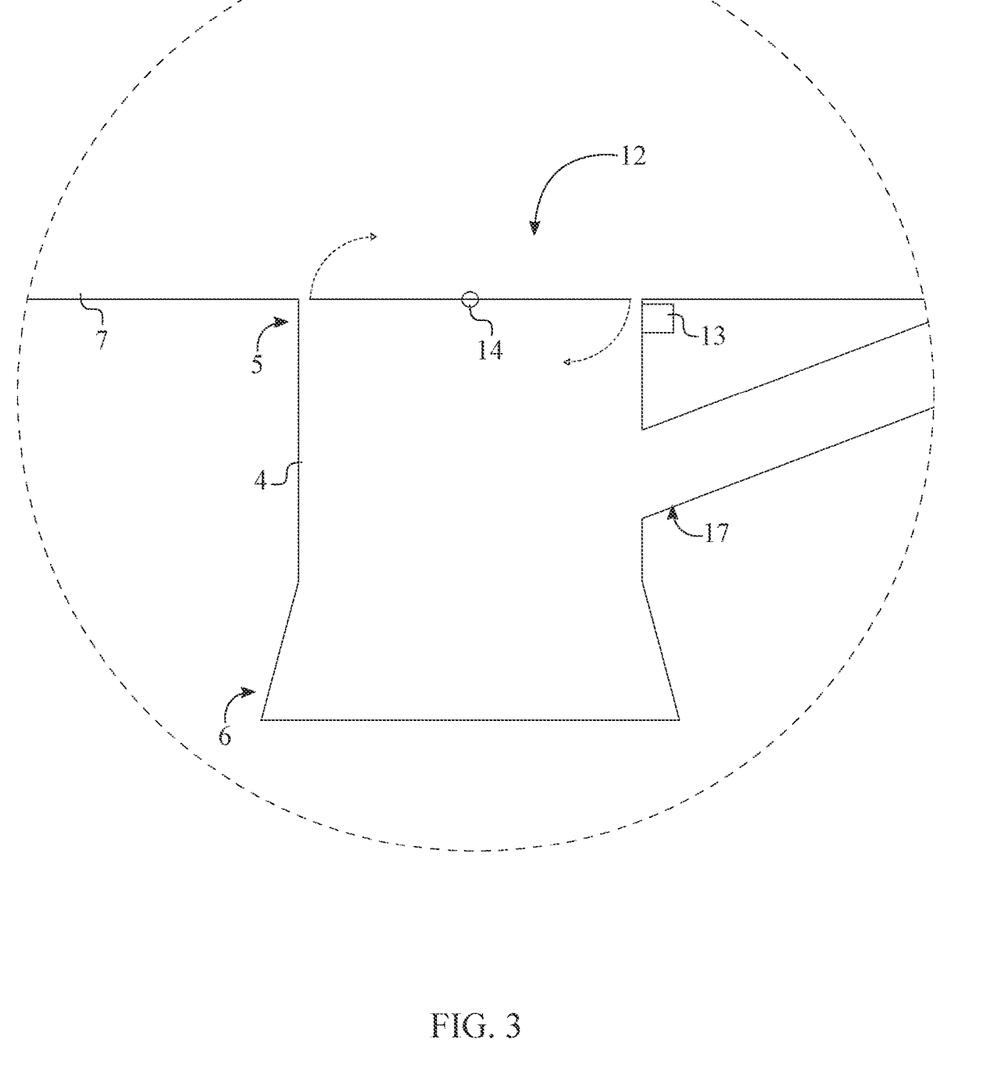
FIG. 3 is a schematic diagram illustrating the second regulator valve of the present invention.

In reference to FIG. 1 and FIG. 3, A proximal end 5 of the nozzle duct 4 is hermetically connected to the pressurized air tank 7 as a distal end 6 of the nozzle duct 4 is positioned offset from the pressurized air tank 7. In other words, the length of the nozzle duct 4 is defined from the proximal end 5 to distal end 6. As a result, the pressurized air within the pressurized air tank 7 is discharged into nozzle duct 4 through the proximal end 5 and discharged into the environment through the distal end 6 as the second flow of pressurized air. An inlet end 16 of the power-generating tube 15 is hermetically connected to the pressurized air tank 7 so that the first flow of pressurized air can be discharged into the plurality of air-flow generators 18. An outlet end 17 of the power-generating tube 15 is hermetically connected to the nozzle duct 4 as the outlet end 17 of the power-generating tube 15 is positioned in between the proximal end 5 and the distal end 6. As a result, the first flow of pressurized air is able to discharge into the environment through the distal end 6 after the rotation of the plurality of air-flow generators 18. Furthermore, the process of discharging the second flow of pressurized air through the distal end 6 results in a linear movement for the present invention thus functioning similar to an engine.

Figure 2:
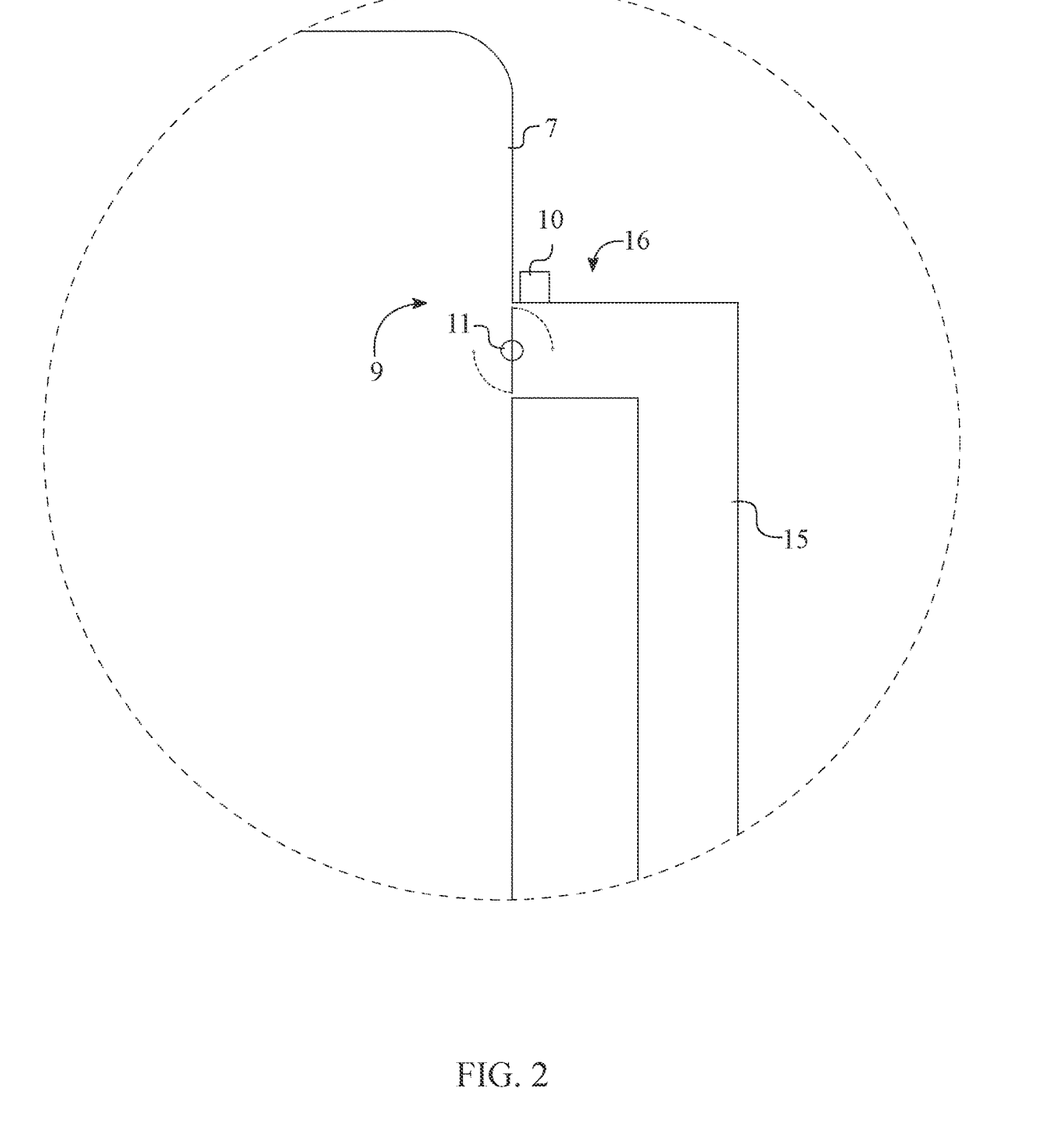
FIG. 2 is a schematic diagram illustrating the first regulator valve of the present invention.

In reference to FIG. 1 and FIG. 2, the present invention may further comprise a first regulator valve 9 that is positioned about the inlet end 16 of the power-generating tube 15. The first regulator valve 9 is operatively coupled within the power-generating tube 15, wherein the first regulator valve 9 regulates the first flow of pressurized air from the pressurized air tank 7. More specifically, the first regulator valve 9 may comprise a first actuator 10 and a tube-valve body 11. The tube-valve body 11 mechanically controls the first flow of pressurized air as the inlet end 16 of the power-generating tube 15 is hermetically connected to the pressurized air tank 7 through the tube-valve body 11. The first actuator 10 is integrated into the tube-valve body 11 and functions as the apparatus that controls the operation of the tube-valve body 11. For example, the first actuator 10 can be activated via user/operator engagement or a pre-set threshold that is integrated or programed to open and close the tube-valve body 11. When the tube-valve body 11 is opened via the first actuator 10, the first flow of pressurized air from the pressurized air tank 7 enters into the power-generating tube 15 and rotates the plurality of air-flow generators 18. When the tube-valve body 11 is closed via the first actuator 10, the rotation of the plurality of air-flow generators 18 stops as the first flow of pressurized air from the pressurized air tank 7 is not able to enter into the power-generating tube 15.

In reference to FIG. 1 and FIG. 3, the present invention may further comprise a second regulator valve 12 that is positioned about the proximal end 5 of the nozzle duct 4. The second regulator valve 12 is operatively coupled within the nozzle duct 4, wherein the second regulator valve 12 regulates the second flow of pressurized air from the pressurized air tank 7. More specifically, the second regulator valve 12 may comprise a second actuator 13 and a nozzle-valve body 14. The nozzle-valve body 14 mechanically controls the second flow of pressurized air. The second actuator 13 is integrated into the nozzle-valve body 14 and functions as the apparatus that controls the operation of the nozzle-valve body 14. For example, the second actuator 13 can be activated via user/operator engagement or a pre-set threshold that is integrated or programed to open and close the nozzle-valve body 14. When the nozzle-valve body 14 is opened via the second actuator 13, the second flow of pressurized air from the pressurized air tank 7 discharges into the environment thus generating thrust. When the nozzle-valve body 14 is closed via the second actuator 13, thrust generation stops as the second flow of pressurized air from the pressurized air tank 7 is not able to enter into the nozzle duct 4.

Figure 4:
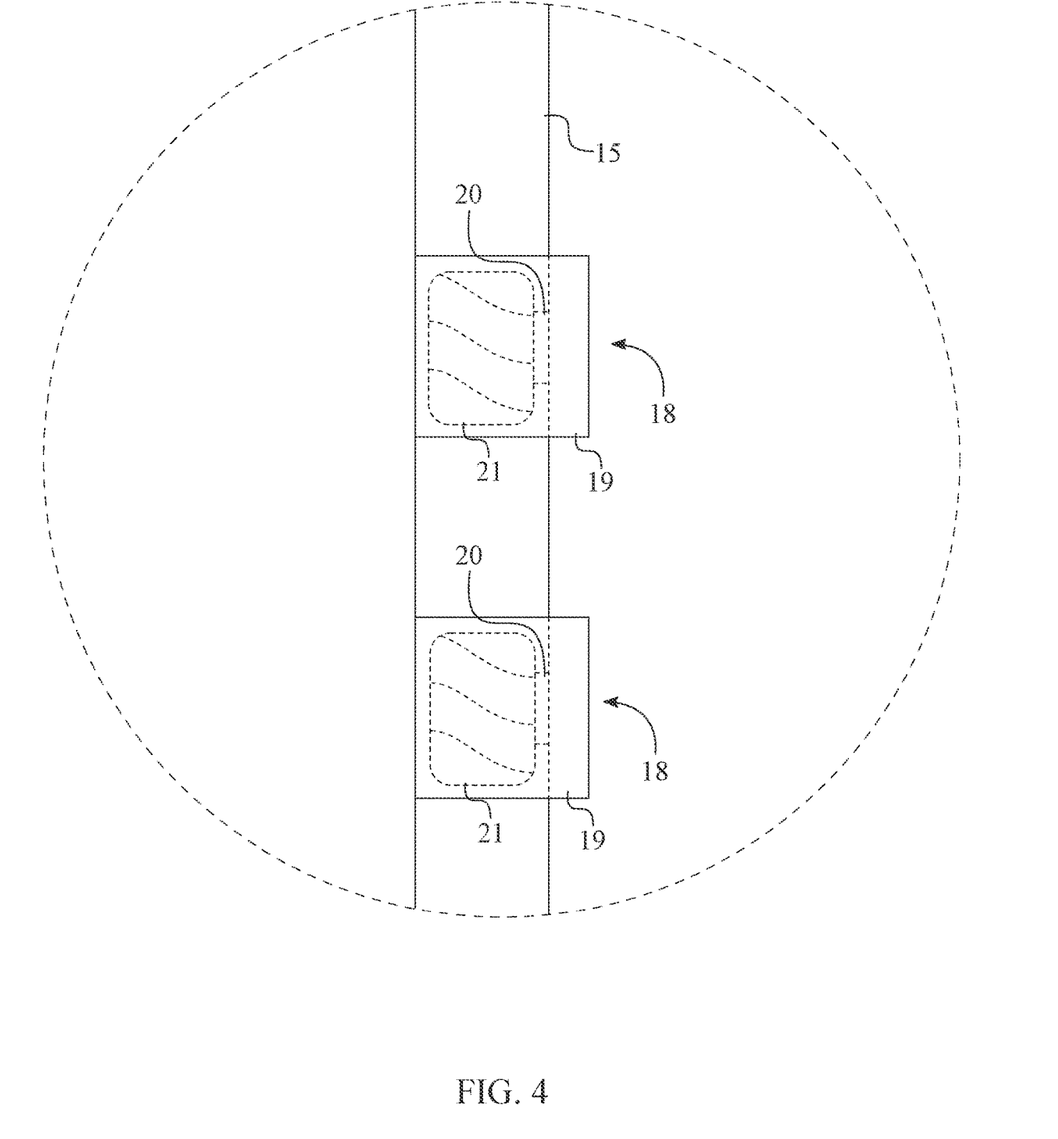
FIG. 4 is a schematic diagram illustrating the plurality of air-flow generators of the present invention.

In reference to FIG. 1 and FIG. 4, each of the plurality of air-flow generators 18 may comprise a stator 19, a rotor 20, and a turbine 21. The stator 19 is adjacently mounted to the power-generating tube 15 and positioned in between the inlet end 16 of the power-generating tube 15 and the outlet end 17 of the power-generating tube 15. The rotor 20 traverses into the power-generating tube 15 so that the turbine 21 can engage with the first flow of pressurized air. More specifically, the turbine 21 is terminally mounted to the rotor 20 and rotatably positioned within the power-generating tube 15 to harness the kinetic energy of the first flow of pressurized air. As a result, the turbine 21 is able to rotate the rotor 20 and generate electricity which is then transferred to the first battery 22 and the second battery 23.

In reference to FIG. 5, the present invention may further comprise at least one alternating current (AC) outlet 25. The AC outlet 25 is electrically connected to the inverter 24 and functions as an optional power outlet within the present invention. The compressor 8 is electrically connected to the second battery 23 through the inverter 24 so that the second battery 23 is able to continuously power the compressor 8. The inverter 24 is an electronic device that converts DC current to AC current within the present invention so that the compressor 8 and the AC outlet 25 can be electrically powered. Preferably, the inverter 24 may convert 12 volt (V) or 24V of the second battery 23 to 100 V/220 V.

In reference to FIG. 5, the plurality of DC accessories 26 may comprise a control panel 27, a plurality of flight controls 28, and a plurality of radio controls 29. The control panel 27 that allows the user to control electrical components of the present invention is electrically connected to the first battery 22. The plurality of flight controls 28 that controls the flight dynamic of the present invention is electrically connected to the first battery 22. The plurality of radio controls 29 that accomplish communication aspects of the present invention is electrically connected to the first battery 22. Resultantly, the first battery 22 is able to fully power the control panel 27, the plurality of flight controls 28, and the plurality of radio controls 29 as the first battery 22 is continuously charged via the plurality of air-flow generators 18.

In reference to FIG. 1, the air compressing unit 1 may further comprise a motor housing 30 that protects some of the components from outside elements. More specifically, an inlet opening 3 of the supply duct 2 is integrated onto the motor housing so that the incoming flow of environmental air can be supplied to the compressor 8. The supply duct 2 is internally mounted to the motor housing 30. The distal end 6 of the nozzle duct 4 is externally positioned to the motor housing 30 as the nozzle duct 4 is internally mounted to the motor housing 30. The secured positioning of the supply duct 2 and the nozzle duct 4 ensure that the air flow within the motor housing 30 is efficient and consistent. The pressurized air tank 7 is internally mounted to the motor housing 30. The compressor 8 is internally mounted to the motor housing 30. The power-generating tube is internally mounted to the motor housing 30. The secured positionings of the pressurized air tank 7, the compressor 8, and the power-generating tube 15 protect each corresponding device from vibration damage and structural damage.

Gaseous planets, such as Jupiter, may be approached by a satellite equipped with the present invention. To sustain the operation of the satellite with the compressor 8, the descent of the satellite is slowed and kept at a certain height where the compressor 8 may charge and operate without deviating from the scope of the functionality. All the gaseous planets may be examined closer, keeping the satellite at a height where the atmospheric pressure may not affect the functionality of the present invention.

Further, drones equipped with the present invention may operate automatically without a pilot and may be operated from the ground with an integrated camera that is operated via the control panel 27. Further, the drone equipped with the present invention may be capable of performing 360-degree maneuverability. Further, a wired electronic fuel connection to the drone or the flying unit may not be required since the present invention does not require fuel tanks.

The present invention may be mechanically fitted to a gearwheel and a round-shape pillar loop. Further, the present invention may be fitted inside the round-shaped pillar loop and rotates a rotating motor. The rotating motor may be electronic, DC motor, stepping motor, or pneumatic. This rotating motor controls the direction of the present invention is oriented and the direction of lead thrust by the nozzle duct 4.

The present invention may be used for airplanes and ships to save fuel costs. Further, the present invention may be environmentally friendly, simply structured, and may be used in the space industry also to save fuel. Further, the present invention may be used for travel, research, and energy supply on other planets for instance mars.

In some embodiments of the present invention, the present invention may comprise a pressure sensor that is configured for sensing and measuring the pressure of the pressurized air tank 7. Further, the pressurized air tank 7 may include a mass flow sensor. Further, the mass flow sensor may be configured for sensing and measuring the mass flow rate of the pressurized flow of air from the compressor 8 and the second flow of pressurized air from the pressurized air tank 7. Further, the aircraft or the flying unit that incorporates the present invention may include a plurality of aircraft sensors such as a temperature sensor, an altimeter, a speed sensor, an oxygen sensor, a force, and vibration sensor, etc. Further, the plurality of aircraft sensors may be configured for sensing and measuring a plurality of flight parameters. Further, the plurality of flight parameters may include the speed of the aircraft, altitude of the aircraft, temperature of the aircraft, oxygen level in the aircraft, etc.

In some embodiments of the present invention, the control panel 27 may further comprise a communication device and the controller. The communication device is configured for transmitting or receiving data that is related to the operation and the maintenance of the present invention. The controller functions as the central process unit of the present invention and electronically connected to all the electric components of the present invention. For example, the controller is electronically connected to the compressor 8, the first regulator valve 9, the second regulator valve 12, the plurality of air-flow generators 18, and other related and explained electrical components of the present invention.

Although the invention has been explained in relation to its preferred embodiment, it is to be understood that many other possible modifications and variations can be made without departing from the spirit and scope of the invention as hereinafter claimed.

What is claimed is:

1. An energy converter that utilizes compressed environmental air comprising:
   an air compressing unit;
   at least one first battery;
   at least one second battery;
   an inverter;
   a plurality of direct current (DC) accessories;
   the air compressing unit comprising a supply duct, a nozzle duct, a pressurized air tank, a compressor, a power-generating tube, and a plurality of air-flow generators;
   the compressor being in fluid communication with the supply duct;
   the pressurized air tank being in fluid communication with the compressor;
   the nozzle duct being in fluid communication with the pressurized air tank;
   the power-generating tube being in fluid communication with the pressurized air tank and nozzle duct;
   the plurality of air-flow generators being operatively coupled within the power-generating tube, wherein a first flow of pressurized air from the pressurized air tank rotates the plurality of air-flow generators;
   the first battery being electrically connected to the plurality of air-flow generators;
   the second battery being electrically connected to the plurality of air-flow generators;
   the plurality of DC accessories being electrically connected to the first battery; and
   the compressor being electrically connected to the second battery through the inverter.

2. The energy converter that utilizes compressed environmental air as claimed in claim 1 comprising:
   a proximal end of the nozzle duct being hermetically connected to the pressurized air tank;
   a distal end of the nozzle duct being positioned offset from the pressurized air tank;
   an inlet end of the power-generating tube being hermetically connected to the pressurized air tank;
   an outlet end of the power-generating tube being hermetically connected to the nozzle duct; and
   the outlet end of the power-generating tube being positioned in between the proximal end and the distal end.

3. The energy converter that utilizes compressed environmental air as claimed in claim 1 comprising:
   a first regulator valve;
   the first regulator valve positioned about an inlet end of the power-generating tube; and
   the first regulator valve being operatively coupled within the power-generating tube, wherein the first regulator valve regulates the first flow of pressurized air from the pressurized air tank.

4. The energy converter that utilizes compressed environmental air as claimed in claim 3 comprising:
   the first regulator valve comprising a first actuator and a tube-valve body;
   the inlet end of the power-generating tube being hermetically connected to the pressurized air tank through the tube-valve body; and
   the first actuator being integrated into the tube-valve body.

5. The energy converter that utilizes compressed environmental air as claimed in claim 1 comprising:
   a second regulator valve;
   the second regulator valve positioned about a proximal end of the nozzle duct; and
   the second regulator valve being operatively coupled within the nozzle duct, wherein the second regulator valve regulates a second flow of pressurized air from the pressurized air tank.

6. The energy converter that utilizes compressed environmental air as claimed in claim 5 comprising:
   the second regulator valve comprising a second actuator and a nozzle-valve body;
   the proximal end of the nozzle duct being hermetically connected to the pressurized air tank through the nozzle-valve body; and
   the second actuator being integrated into the nozzle-valve body.

7. The energy converter that utilizes compressed environmental air as claimed in claim 1 comprising:
   each of the plurality of air-flow generators comprising a stator, a rotor, and a turbine;
   the stator being adjacently mounted to the power-generating tube;
   the stator being positioned in between an inlet end of the power-generating tube and an outlet end of the power-generating tube;
   the rotor traversing into the power-generating tube;
   the turbine being terminally mounted to the rotor; and
   the turbine being rotatably positioned within the power-generating tube.

8. The energy converter that utilizes compressed environmental air as claimed in claim 1 comprising:
   at least one alternating current (AC) outlet; and
   the AC outlet being electrically connected to the inverter.

9. The energy converter that utilizes compressed environmental air as claimed in claim 1 comprising:
   the plurality of DC accessories comprising a control panel, a plurality of flight controls, and a plurality of radio controls;
   the control panel being electrically connected to the first battery;
   the plurality of flight controls being electrically connected to the first battery; and
   the plurality of radio controls being electrically connected to the first battery.

10. The energy converter that utilizes compressed environmental air as claimed in claim 1 comprising:
    the air compressing unit further comprising a motor housing;
    an inlet opening of the supply duct being integrated onto the motor housing;
    the supply duct being internally mounted to the motor housing;
    a distal end of the nozzle duct being externally positioned to the motor housing;
    the nozzle duct being internally mounted to the motor housing;
    the pressurized air tank being internally mounted to the motor housing;
    the compressor being internally mounted to the motor housing; and
    the power-generating tube being internally mounted to the motor housing.

11. An energy converter that utilizes compressed environmental air comprising:
    an air compressing unit;
    at least one first battery;
    at least one second battery;
    an inverter;
    a plurality of direct current (DC) accessories;
    a first regulator valve;

a second regulator valve;
the air compressing unit comprising a supply duct, a nozzle duct, a pressurized air tank, a compressor, a power-generating tube, and a plurality of air-flow generators;
the compressor being in fluid communication with the supply duct;
the pressurized air tank being in fluid communication with the compressor;
the nozzle duct being in fluid communication with the pressurized air tank;
the power-generating tube being in fluid communication with the pressurized air tank and nozzle duct;
the plurality of air-flow generators being operatively coupled within the power-generating tube, wherein a first flow of pressurized air from the pressurized air tank rotates the plurality of air-flow generators;
the first battery being electrically connected to the plurality of air-flow generators;
the second battery being electrically connected to the plurality of air-flow generators;
the plurality of DC accessories being electrically connected to the first battery;
the compressor being electrically connected to the second battery through the inverter;
the first regulator valve being operatively coupled within the power-generating tube, wherein the first regulator valve regulates the first flow of pressurized air from the pressurized air tank; and
the second regulator valve being operatively coupled within the nozzle duct, wherein the second regulator valve regulates a second flow of pressurized air from the pressurized air tank.

12. The energy converter that utilizes compressed environmental air as claimed in claim 11 comprising:
a proximal end of the nozzle duct being hermetically connected to the pressurized air tank;
a distal end of the nozzle duct being positioned offset from the pressurized air tank;
an inlet end of the power-generating tube being hermetically connected to the pressurized air tank;
an outlet end of the power-generating tube being hermetically connected to the nozzle duct; and
the outlet end of the power-generating tube being positioned in between the proximal end and the distal end.

13. The energy converter that utilizes compressed environmental air as claimed in claim 11 comprising:
the first regulator valve comprising a first actuator and a tube-valve body;
the first regulator valve positioned about an inlet end of the power-generating tube;
the inlet end of the power-generating tube being hermetically connected to the pressurized air tank through the tube-valve body; and
the first actuator being integrated into the tube-valve body.

14. The energy converter that utilizes compressed environmental air as claimed in claim 11 comprising:
the second regulator valve comprising a second actuator and a nozzle-valve body;
the second regulator valve positioned about a proximal end of the nozzle duct;
the proximal end of the nozzle duct being hermetically connected to the pressurized air tank through the nozzle-valve body; and
the second actuator being integrated into the nozzle-valve body.

15. The energy converter that utilizes compressed environmental air as claimed in claim 11 comprising:
each of the plurality of air-flow generators comprising a stator, a rotor, and a turbine;
the stator being adjacently mounted to the power-generating tube;
the stator being positioned in between an inlet end of the power-generating tube and an outlet end of the power-generating tube;
the rotor traversing into the power-generating tube;
the turbine being terminally mounted to the rotor; and
the turbine being rotatably positioned within the power-generating tube.

16. The energy converter that utilizes compressed environmental air as claimed in claim 11 comprising:
at least one alternating current (AC) outlet; and
the AC outlet being electrically connected to the inverter.

17. The energy converter that utilizes compressed environmental air as claimed in claim 11 comprising:
the plurality of DC accessories comprising a control panel, a plurality of flight controls, and a plurality of radio controls;
the control panel being electrically connected to the first battery;
the plurality of flight controls being electrically connected to the first battery; and
the plurality of radio controls being electrically connected to the first battery.

18. The energy converter that utilizes compressed environmental air as claimed in claim 11 comprising:
the air compressing unit further comprising a motor housing;
an inlet opening of the supply duct being integrated onto the motor housing;
the supply duct being internally mounted to the motor housing;
a distal end of the nozzle duct being externally positioned to the motor housing;
the nozzle duct being internally mounted to the motor housing;
the pressurized air tank being internally mounted to the motor housing;
the compressor being internally mounted to the motor housing; and
the power-generating tube being internally mounted to the motor housing.

* * * * *